(12) United States Patent
Ido

(10) Patent No.: US 7,035,667 B2
(45) Date of Patent: Apr. 25, 2006

(54) COMMUNICATION APPARATUS AND COMMUNICATION METHOD

(75) Inventor: Tetsuo Ido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 10/170,720

(22) Filed: Jun. 14, 2002

(65) Prior Publication Data

US 2002/0198023 A1 Dec. 26, 2002

(30) Foreign Application Priority Data

Jun. 20, 2001 (JP) ............................ 2001-186753

(51) Int. Cl.
*H04M 1/00* (2006.01)

(52) U.S. Cl. ............... 455/556.1; 455/556.2; 455/557; 455/90.1; 455/412.2; 348/211.2; 709/201; 709/203

(58) Field of Classification Search ............ 455/556.1, 455/556.2, 557, 90.1, 550.1, 403, 412.2, 455/414.1, 426.1, 422; 709/201, 203; 348/211.1, 348/211.2; 396/56, 57

See application file for complete search history.

(56) References Cited

U.S. PATENT DOCUMENTS

| 6,288,800 | B1 | 9/2001 | Izumi ........................ 358/468 |
| 6,337,712 | B1 | 1/2002 | Shiota et al. ................ 348/231 |
| 6,535,243 | B1 * | 3/2003 | Tullis ...................... 348/207.1 |
| 6,650,794 | B1 | 11/2003 | Aoki ......................... 382/306 |
| 6,701,351 | B1 * | 3/2004 | Gann ......................... 709/217 |
| 6,715,003 | B1 * | 3/2004 | Safai ......................... 710/33 |
| 2002/0054224 | A1 * | 5/2002 | Wasula et al. ............... 348/232 |
| 2002/0137544 | A1 * | 9/2002 | Myojo ........................ 455/557 |
| 2003/0027603 | A1 * | 2/2003 | Takasaki ..................... 455/566 |
| 2003/0083098 | A1 * | 5/2003 | Yamazaki et al. ........... 455/556 |
| 2004/0192383 | A1 * | 9/2004 | Zacks et al. ................ 455/557 |

FOREIGN PATENT DOCUMENTS

| EP | 0833494 A2 | 4/1998 |
| JP | 10-150523 | 6/1998 |
| JP | 10-224591 | 8/1998 |
| WO | 00/74370 A1 | 12/2000 |
| WO | 01/25094 A2 | 4/2001 |
| WO | WO 01/25094 * | 4/2001 |

OTHER PUBLICATIONS

Patent Abstracts of Japan, vol. 2000, No. 21, Aug. 3, 2001—JP 2001-092813 A.

* cited by examiner

*Primary Examiner*—Edan Orgad
(74) *Attorney, Agent, or Firm*—Fitzpatrick, Cella, Harper & Scinto

(57) ABSTRACT

A communication device selects image data to be transmitted to a public network from image data stored in an imaging device, inputs a character string, converts the file name of image data received from the imaging device into the input character string, and transmits the image data to the public network. Upon reception of a request for image data from the public network, the communication device converts the file name of the requested image data into the file name received from the imaging device, and requests transmission of the image data from the imaging device.

6 Claims, 7 Drawing Sheets

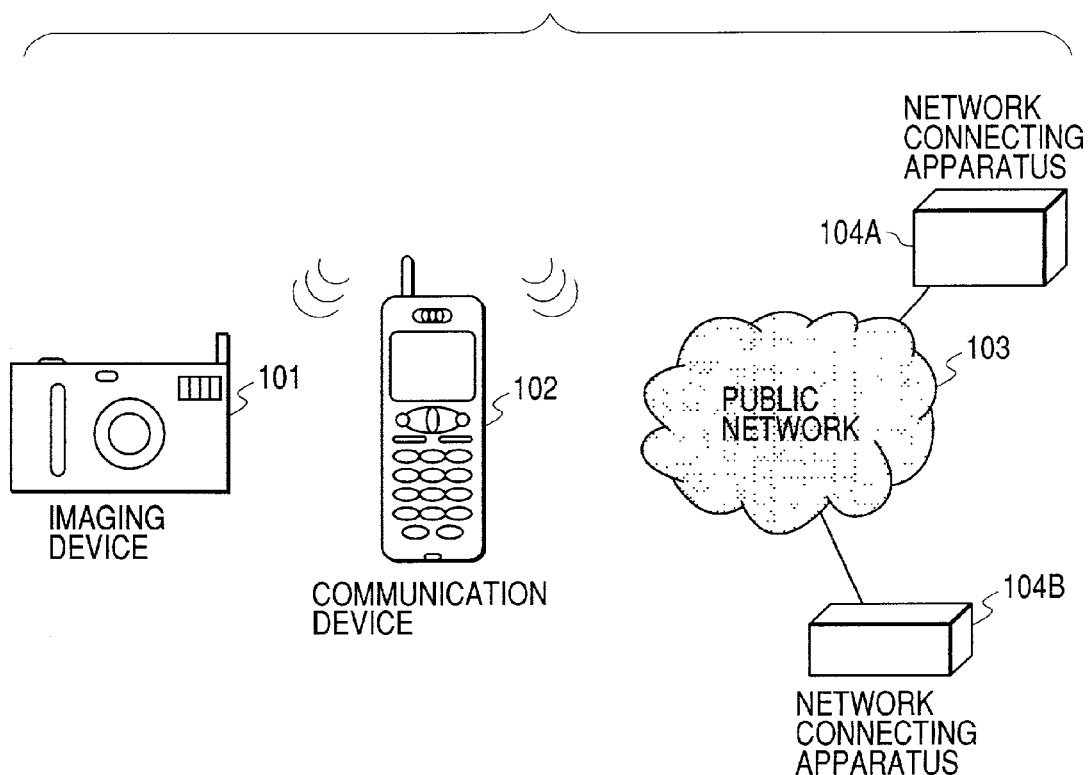

COMMUNICATION APPARATUS AND COMMUNICATION METHOD

BACKGROUND OF THE INVENTION

1. Field of the Invention

The present invention relates to a communication device, such as a personal computer, a portable phone and a PDA, equipped with a means for transferring data via a public network and a means for transferring data locally instead of using the public network.

2. Related Background Art

With the advent of the Internet, mails can be exchanged and information can be obtained by accessing Web sites. From this reason, personal computers (hereinafter called a PC) with a public network connection function are prevailing.

Some wireless phones can provide a text mail function and a simple Web browser function. Recently, phone services compatible with the Internet standard protocols are commercially available. It is expected that wireless phones will prevail which have the functions similar to an e-mail function and a Web access function implemented in a PC.

A large amount of image data is used by e-mails and Web sites. Generally, image data to be transferred is taken with a scanner or a digital still camera and loaded in a PC and thereafter, it is appended to an e-mail or uploaded to a home page. In loading image data, a dedicated digital interface, a universal serial bus (USB) and the like are used conventionally. In order to avoid cumbersome cable connections, a local wireless interface for locally transferring data in a wireless manner is now studied instead of using cables.

Image data taken with an imaging device such as a digital still camera is loaded in a PC or a communication device having a public network connection function such as a portable phone, and thereafter transferred to a desired site. In this case, the digital camera automatically generates the file name of image data independently from the contents of the image. Therefore, the receiver of the image data via the public network cannot infer the contents of the image from the file name of image data.

The file name of image data taken with an imaging device is automatically given by an imaging device. This file name is generated in accordance with a number automatically assigned by the imaging device. Image data is stored in a removable memory of the imaging device in correspondence with the file names having the file structure such as shown in FIG. 4.

When the receiver stores the image data, it is necessary for the receiver to change the file name to the file name suitable for the contents of the image, or to the file name from which the image contents can be intuitively inferred.

SUMMARY OF THE INVENTION

According to the invention, a communication device is connected to an image storing device such as an imaging device via local communication. Image data transferred from the image storing device is given a file name suitable for the contents of the image, or a file name from which the image contents can be intuitively inferred, by a user using a character input means of the communication device. The communication device can transfer the image data given the file name to the public network.

The receiver side of the image data received via the public network is not necessary to perform a cumbersome work of converting the file name of the image data.

The communication device stores file name conversion information in a database when the file name is converted. Therefore, when the communication device is requested from the public network to transmit image data, the communication device can notify the image storing device connected via local communication of an image data transmission request, by using the file name of the image data stored in the image storing device.

Other objects of the present invention will become apparent from the following description of the embodiments.

BRIEF DESCRIPTION OF THE DRAWINGS

FIG. 1 is a diagram showing the structure of an image data transfer system according to an embodiment of the invention.

FIG. 2 is a diagram showing an example of a database stored in a communication device.

DESCRIPTION OF THE PREFERRED EMBODIMENTS

Embodiments of the invention will be described with reference to the accompanying drawings.

FIG. 1 shows an image data transfer system according to an embodiment.

In this system, an imaging device 101 or image storing device is connected to a communication device 102 or a wireless phone by a local communication means. The communication device 102 is connected to a public network 103 by a public network communication means. The communication device 102 can transfer data to a network connecting apparatus 104A or 104B over the public network 103. The network connecting apparatus 104A or 104B can transfer data to the communication device 102 over the public network 103.

Figure 3:
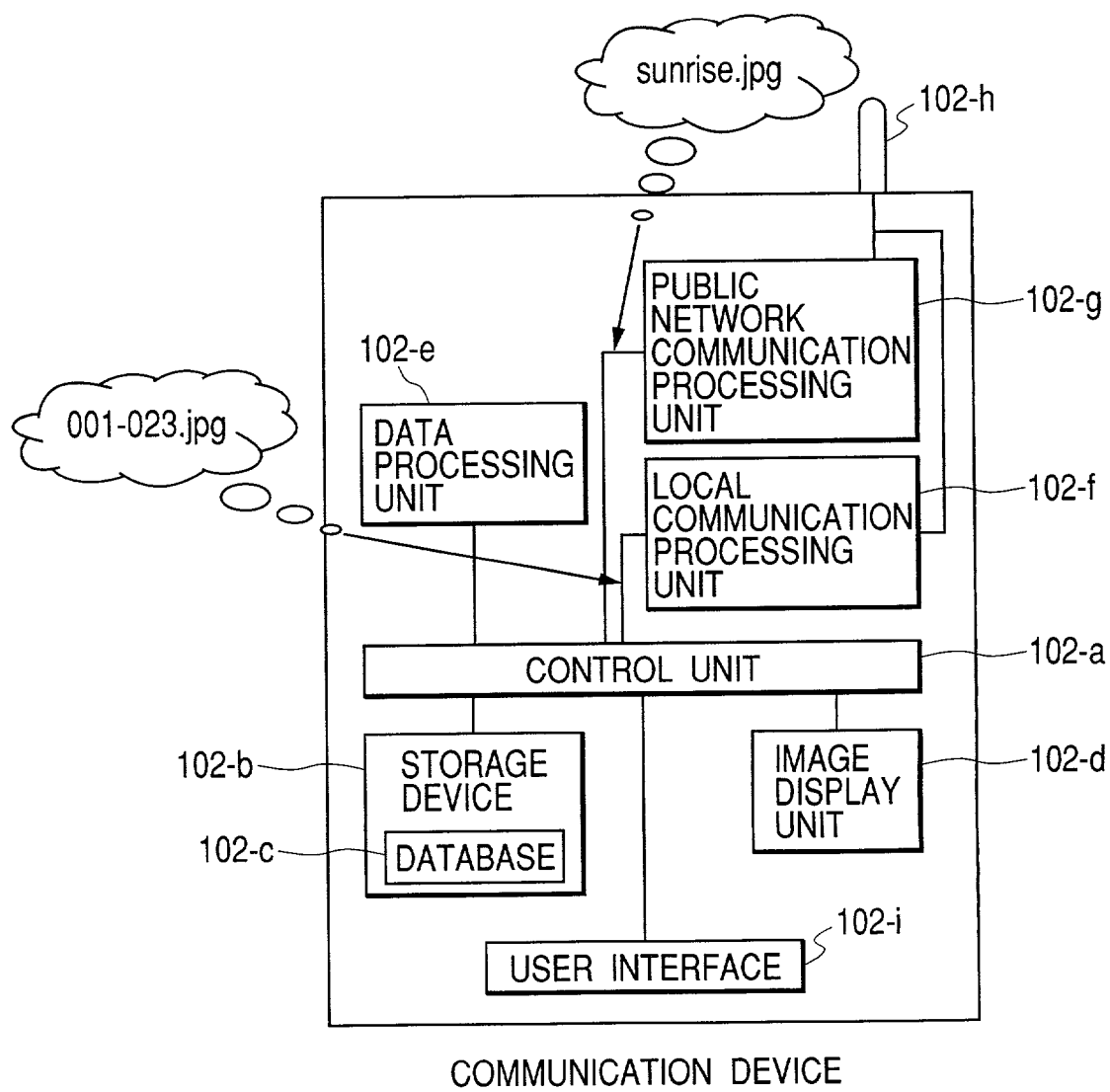
FIG. 3 is a functional block diagram of the communication device.
Figure 4:
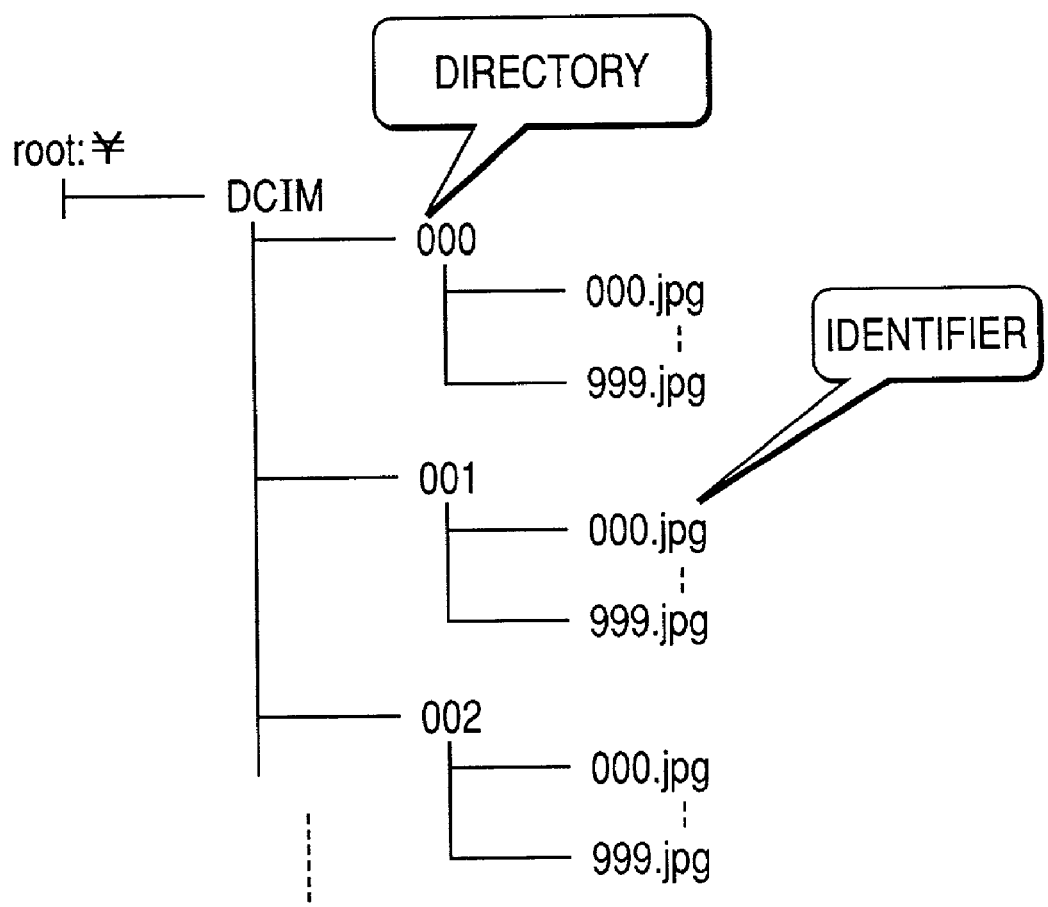
FIG. 4 is a diagram showing file names automatically generated by an imaging device and stored in a memory, and the file structure.

The structure of the communication device 102 used by this system will be described with reference to the functional block diagram of FIG. 3.

The communication device 102 has functional blocks: a control unit 102-$a$, a storage device 102-$b$, a database 102-$c$ stored in the storage device 102-$b$, an image display unit 102-$d$, a data processing unit 102-$e$, a local communication processing unit 102-$f$, a public network communication processing unit 102-$g$, an antenna 102-$h$ and a user interface 102-$i$.

Each functional block will be described.

The local communication processing unit 102-$f$ is a means for communication through local communication connection by using the antenna 102-$h$, and the public network communication processing unit 102-$g$ is a means for communication through connection to the public network 103 by using the antenna 102-$h$.

The user interface 102-$i$ is used by a user as a character input means and a selection means. The data processing unit 102-*e* converts each file name under the control of the control unit 102-*a*. The image display unit 102-*d* displays images, characters or the like under the control of the control unit 102-*a*.

The storage device 102-*b* stores data and other information under the control of the control unit 102-*a*. The database 102-*c* is, as shown in FIG. 2, a table storing file names used by local communication together with corresponding file names used by public network communication.

By using these functional blocks, the communication device 102 performs local communication and public network communication and has the file name convert function that the data processing unit 102-*e* converts each file name by using information stored in the database 102-*c*.

Figure 5:
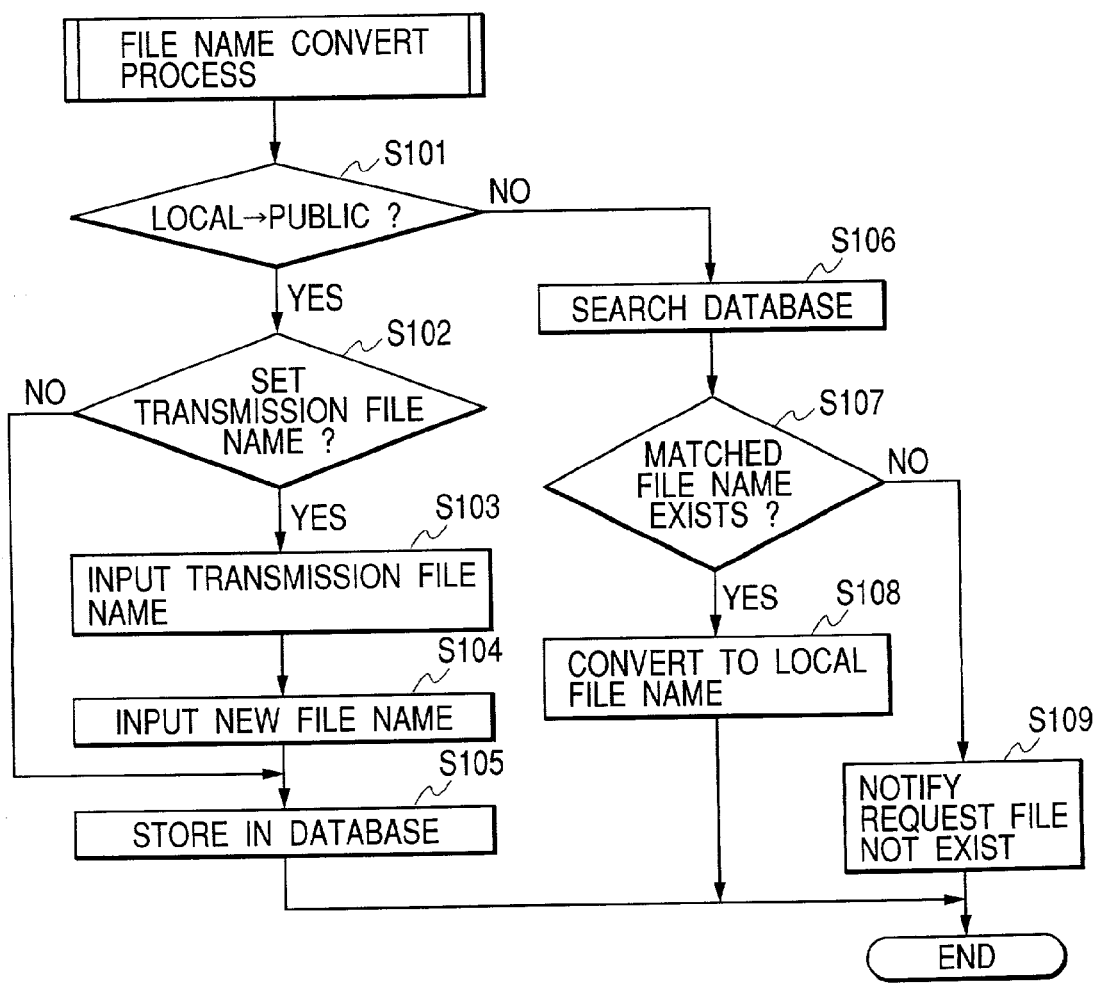
FIG. 5 is a flow diagram illustrating a file name convert process.

A file name convert process to be executed by the functional block, i.e., data processing unit 102-*e* of the communication device 102 under the control of the control unit 102-*a*, will be described with reference to the flow chart shown in FIG. 5. The flow chart shown in FIG. 5 corresponds to a portion of a program to be executed by the control unit 102-*a*. This program is stored in the storage device 102-*b*. The control unit 102-*a* constituted of a computer reads this program from the storage device 102-*b* to execute the process illustrated in FIG. 5. The storage device 102-*b* is a storage medium storing the program in a manner to be readable by the control unit 102-*a*. The program may be stored in an unrepresented floppy disk or CD-ROM, read by a floppy disk drive or CD-ROM drive communicating with the local communication processing unit 102-*f*, and supplied to the control unit 102-*a* via the local communication processing unit 102-*f*. In this case, the floppy disk or CD-ROM corresponds to a storage medium storing the program in a manner to be readable by the control unit 102-*a*. This program may be supplied to the control unit 102-*a* from the network connecting apparatus 104A or 104B via the public network 103 and public network communication processing unit 102-*g*.

When the functional block, i.e., control unit 102-*a* of the communication device 102 instructs a start of the file name convert process, it is judged at Step S101 whether the file conversion is from a file name used by local communication to a file name used by public network communication, or conversely from a file name used by public network communication to a file name used by local communication.

At Step 101, when image data received at the communication device 102 from the imaging device 101 in local communication connection is transferred to the public network 103, a (local→public) file name convert process is performed. When the file name of image data, which data the network connecting apparatus 104 connected to the public network 103 requested the communication device 102 to transmit, is notified to the imaging device 101 in local communication connection, a (public→local) file name convert process is performed.

If the (local→public) file name convert process is selected, at Step S102 the user is inquired by using the image display unit 102-*d* or the like whether or not a transmission file name is newly set. The user responds this inquiry by using the user interface 102-*i*.

If the user decides that the transmission file name is not necessary to be newly set, the flow skips to step S105. If the user decides that the transmission file name is to be newly set, at Step S103 the user enters a desired file name by using the user interface 102-*i* as the character input means. At Step S104 the data processing unit 102-*e* converts the file name of image data received from the imaging device 101 into the new file name entered by the user interface 102-*i* to thereafter advance to Step S105. Namely, in this embodiment, either the file name (generated by the imaging device 101) of image data received by the local communication processing unit 102-*f* or the file name entered from the user interface 102-*i* is selected by the user for transmission to the public network.

At Step S105 the local communication file name of image data is stored in the database 102-*c* together with a corresponding public network communication file name. As shown in FIG. 2, if it is judged at Step S102 that the transmission file name is not necessary to be newly set, the same name as the local communication file name is stored as the public network communication file name in the database 102-*c*. The left side of FIG. 2 is the file names of image data transmitted to the public network 103, and the right side is the file names of image data received from the imaging device 101 through local communication.

After the above operations, the file name convert process executed when the (local→public) file name convert process was selected is terminated.

If the (public→local) file name convert process is selected at Step S101, then at Step S106 the file name of image data, which data the partner connected via the public network communication processing unit 102-*g* requested to transmit, is searched from the public network communication file name list in the database 102-*c*.

It is checked at Step S107 whether the search result indicates an existence of the matched file name in the list. If there is the matched file name, at Step S108 the public network communication file name of image data, which data the partner connected via the public network communication processing unit 102-*g* requested to transmit, is converted into the local communication file name in accordance with the file name conversion information stored in the database 102-*c*.

If it is judged at Step S107 that there is no matched file name, at Step S109 the public network communication processing unit 102-*g* notifies the network connecting apparatus 104 via the public network 103 of that the requested image data was not transmitted from the communication device 102 in the past.

After the above operations, the file name convert process executed when the (public→local) file name convert process was selected is terminated.

Figure 6:
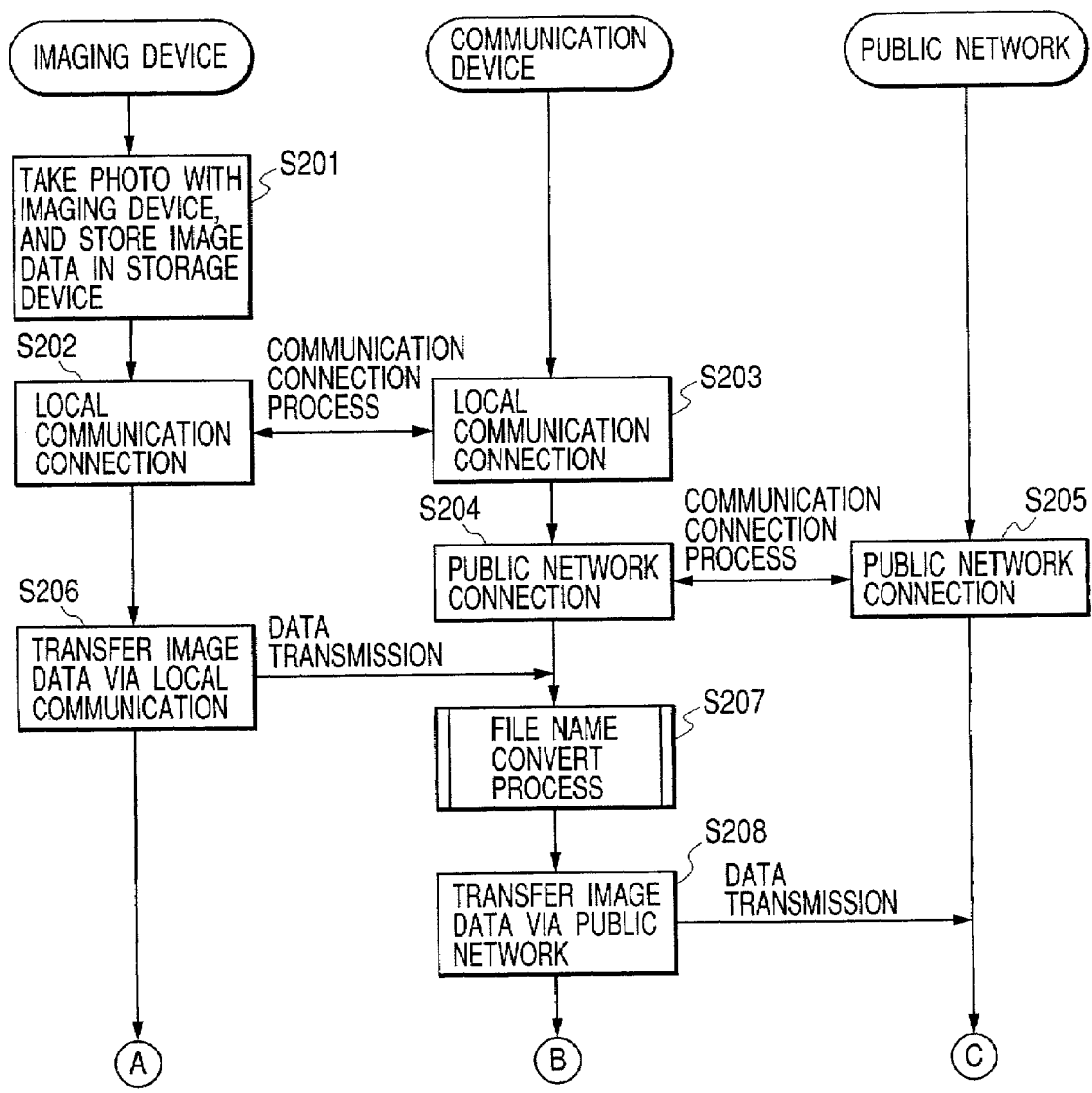
FIGS. 6 and 7 are diagrams illustrating the operation of an image data transfer system according to the embodiment.
Figure 7:
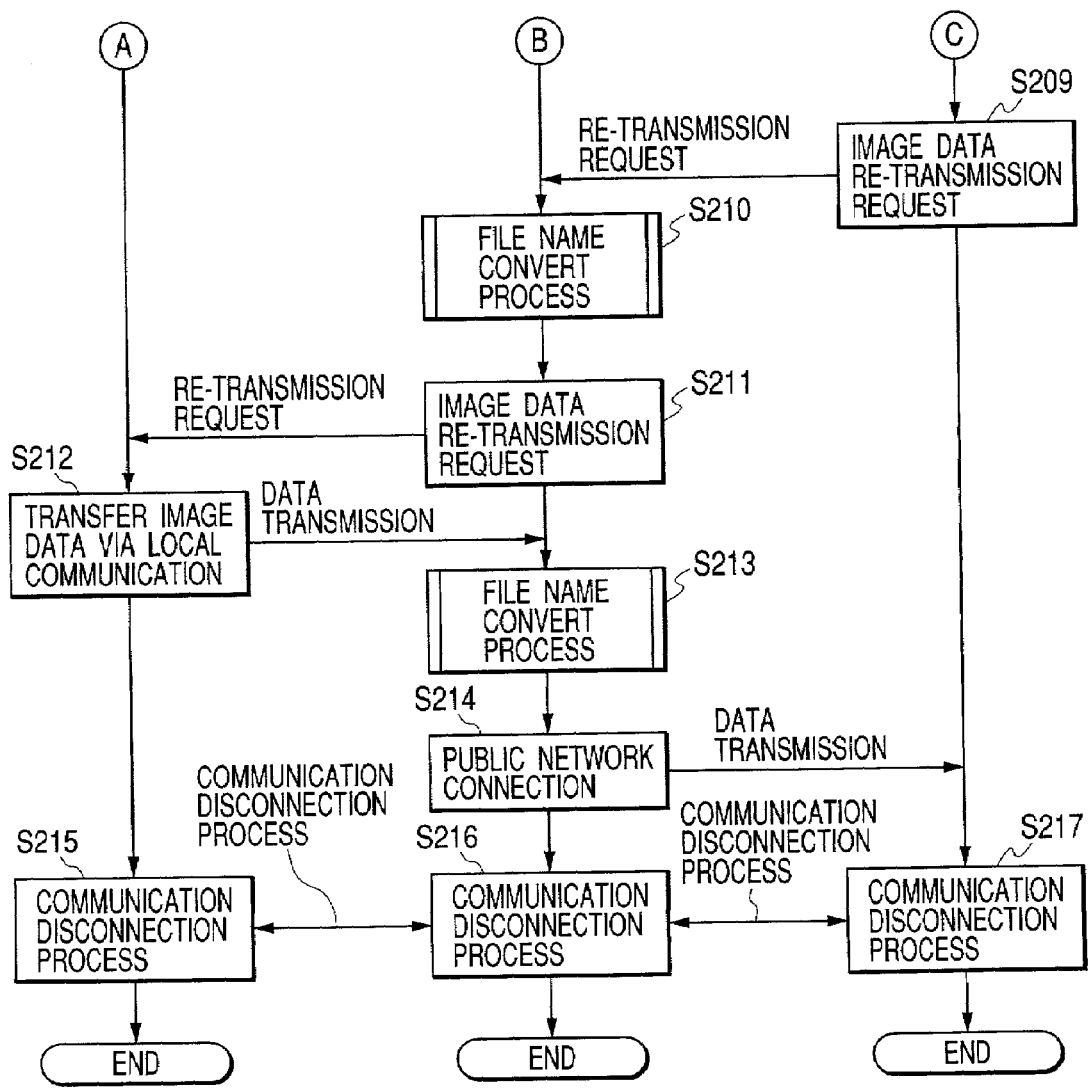

Next, the operation sequence of the image data transfer system of the embodiment will be described with reference to the flow charts shown in FIGS. 6 and 7. Under the control of the control unit 102-*a*, the communication device 102 performs the following operations. The control unit 102-*a* constituted of a computer operates in accordance with the program stored in the storage device 102-*b*. The storage device 102-*b* is a storage medium storing the program in a manner to be readable by the control unit 102-*a*. The program may be stored in an unrepresented floppy disk or CD-ROM, read by a floppy disk drive or CD-ROM drive communicating with the local communication processing unit 102-*f*, and supplied to the control unit 102-*a* via the local communication processing unit 102-*f*. In this case, the floppy disk or CD-ROM corresponds to a storage medium storing the program in a manner to be readable by the control unit 102-*a*. This program may be supplied to the control unit 102-*a* from the network connecting apparatus 104A or 104B via the public network 103 and public network communication processing unit 102-*g*.

First, at Step S201 a user takes a subject image with the imaging device 101 which stores image data in a memory. This memory can be removably mounted on the imaging device.

Next, at Steps S202 and S203 the local communication processing unit 102-*f* of the communication device 102 performs a communication connection process relative to the imaging device 101 to establish a local communication connection.

In succession, at Steps S204 and S205 the public network communication processing unit 102-*g* of the communication device 102 performs a communication connection process relative to the public network 103 to establish a public network communication connection.

After the local communication connection and public network connection are established, at Step S206 the imaging device 101 transfers image data to the communication device 102 via local communication. The file name used at this time is the file name automatically generated by the imaging device 101. The imaging device 101 transmits the image data stored in the removable memory through local communication. The control unit 102-*a* develops the image data received at the local communication processing unit 102-*f* in a manner allowing the image display unit 102-*d* to display it. The image display unit 102-*d* displays the image of the image data.

In this embodiment, a user designates image data to be transmitted to the public network 103 among a plurality of image data sets stored in the imaging device 101, by using the user interface 102-*i*. The local communication processing unit 102-*f* of the communication device 102 requests the imaging device 101 to transfer the image data to be transmitted to the public network 103 among the image data stored in the imaging device 101. The imaging device 101 transmits the requested image data to the communication device 102. This image data is received at the local communication processing unit 102-*f* of the imaging device 101.

At Step S207 the communication device 102 executes for the received image data the file name convert process described with reference to FIG. 5. This Step S207 is bound to be executed because even if the local communication file name is not converted into a public network communication file name, it is necessary to store the local communication file name as the transmission file name in the database 102-*c* as the public network communication file name.

At Step S208 the communication device 102 transmits the image data to the public network 103 by using the public network communication file name.

With the above operations, the image data transfer system of the embodiment transfers data from the imaging device 101 to the public network 103 via the communication device 102.

Next, the operation sequence of the system will be described which is executed when the public network 103 side requests via the communication device 102 the imaging device 101 to transfer image data.

At Step S209 the public network 103 side notifies the communication device 102 of an image data re-transmission request. This notice is received by the public network communication processing unit 102-*g* of the communication device 102. The contents of this notice include the file name of requested image data.

At Step S210 the communication device 102 performs the file name convert process described with reference to FIG. 5 to convert the file name of image data contained in the received notice of the image data re-transmission request into the local communication file name.

In succession, at Step S211 the communication device 102 notifies the imaging device 101 of the re-transmission request for image data having the file name matching the local communication file name, by using the local communication processing unit 102-*f*.

At Step S212 the imaging device 101 reads the image data having the file name matching the local communication file name notified by the communication device 102 from its memory and transfers the image data to the communication device 102 via local communication.

At Step S213 the communication device 102 changes the file name of the received image data, from the local communication file name into the public network communication file name. This public network communication file name is the same as that contained in the re-transmission request received at Step S209.

In succession, at Step S214 the public network communication processing unit 102-*g* of the communication device 102 transfers the image data added with the public network communication file name to the public network 103.

With the above operations, in the image data transfer system of the embodiment, when the communication device 102 receives the image data re-transmission request from the public network 103, the communication device 102 notifies the imaging device 101 of the image data re-transmission request. In response to this notice, the imaging device 101 transmits the image data toward the communication device 102.

The processes at Steps S206 to S208 or the processes at Steps S209 to S214 may be performed repetitively.

After a series of these processes are executed, disconnection processes for local communication and public network communication are performed at Steps S215, S216 and S217.

The operation of the file name convert process to be executed after establishment of local communication connection and public network communication connection has been described above with reference to FIGS. 6 and 7.

Next, the operation of the file name convert process to be executed after establishment of local communication connection and before establishment of public network communication connection will be described.

In this embodiment, the name of transmission data is entered from the user interface 102-*i* (ten-keys) of the communication device 102, and the local communication processing unit 102-*f* requests the imaging device 101 to transfer the transmission data. When the transmission data received at the local communication processing unit 102-*f* is transmitted to the public network 103 from the public network communication processing unit 102-*g*, a name entered from the user interface 102-*i* is added to the transmission data to transmit the transmission data with the name.

Figure 8:
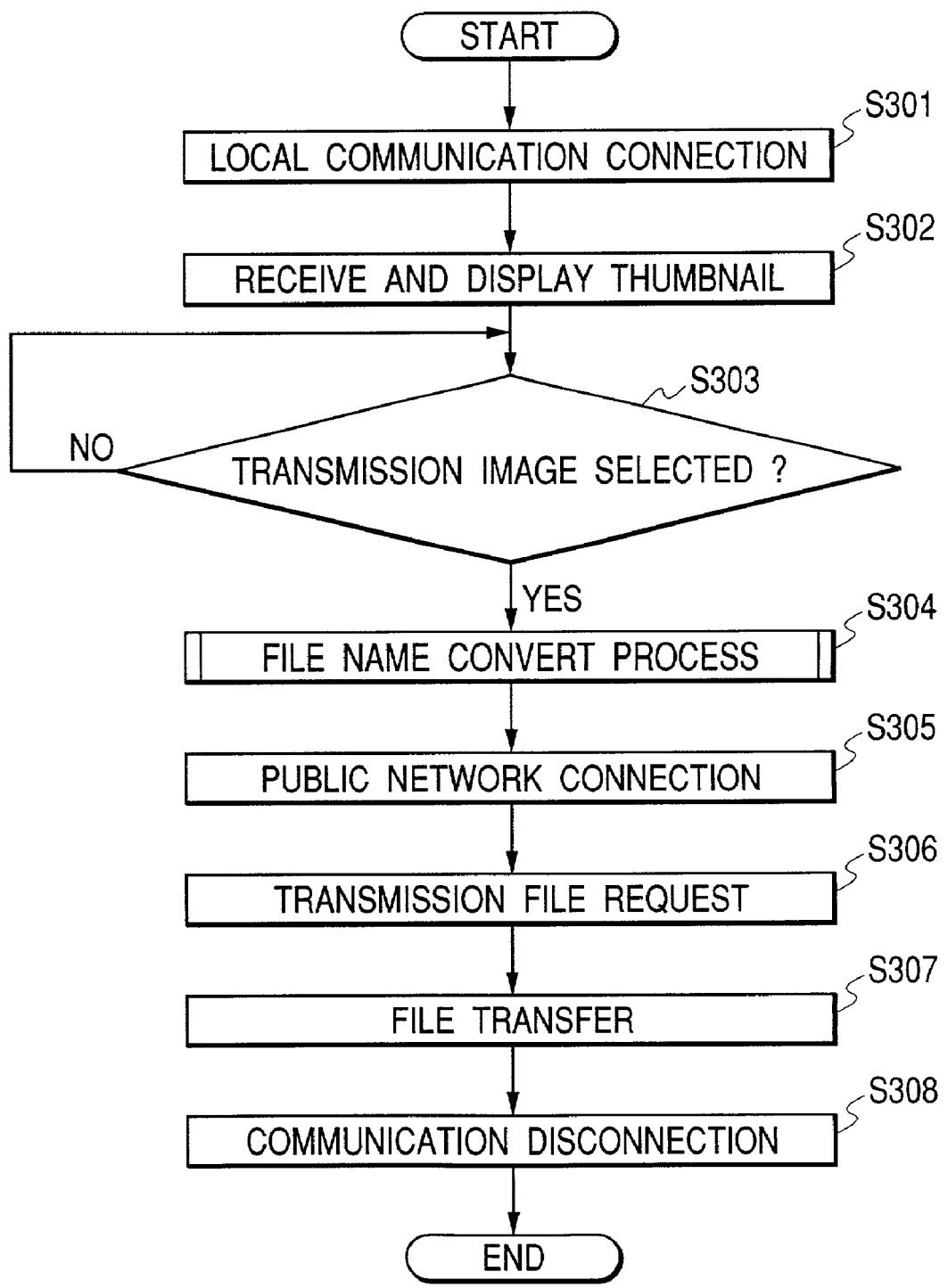
FIG. 8 is a flow chart illustrating the operation of the image data transfer system according to another embodiment.

The flow chart shown in FIG. 8 corresponds to a portion of a program to be executed by the control unit 102-*a*. This program is stored in the storage device 102-*b*. The control unit 102-*a* constituted of a computer reads this program from the storage device 102-*b* to execute the process illustrated in FIG. 8. The storage device 102-*b* is a storage medium storing the program in a manner to be readable by the control unit 102-*a*. The program may be stored in an unrepresented floppy disk or CD-ROM, read by a floppy disk drive or CD-ROM drive communicating with the local communication processing unit 102-*f*, and supplied to the control unit 102-*a* via the local communication processing unit 102-*f*. In this case, the floppy disk or CD-ROM corresponds to a storage medium storing the program in a manner to be readable by the control unit 102-*a*. This program may be supplied to the control unit 102-*a* from the network connecting apparatus 104A or 104B via the public network 103 and public network communication processing unit 102-*g*.

With reference to FIG. 8, the operation of the communication device 102 or a portable phone to be executed under the control of the control unit 102-*a* will be described.

When local communication is instructed from the user interface 102-*i*, the control unit 102-*a* controls the local communication processing unit 102-*f* to establish local communication connection to the imaging device 101 or an image storing apparatus (S301). The communication device 102 receives from the imaging device 101 the file names of image data and thumbnail data stored in the imaging device 101, and displays the file names and thumbnail images on the image display unit 102-*d* (S302). The imaging device 101 stores image data, thumbnail data and file name data, and transmits the data designated by the communication device 102. The thumbnail data is reduced image data having a smaller data amount than image data. A user selects a transmission image by looking at thumbnail images.

The user selects image data intended to be transmitted, by using the user interface 102-*i*, and designates a transmission destination (S303). The control unit 102-*a* performs the file name convert process (S304). With this file name convert process, the file name added to transmission image data is determined. The file name is the name of image data to be transmitted. In this embodiment, when the transmission image is selected by using the user interface 102-*i*, a screen for entering the name of the transmission image is displayed on the image display unit 102-*d*. An example of the user interface 102-*i* for entering the transmission destination is ten-keys. In this embodiment, the file name of transmission image data is input by using ten-keys.

The control unit 102-*a* controls the public network communication processing unit 102-*g* to connect the public network 103 (S305). The local communication processing unit 102-*f* requests the imaging device 101 to send the image data of the image selected at S303 (S306). For example, the file name received at S302 is notified to the imaging device 101. Alternatively, data representative of the ordinal number of the image among those images received from the imaging device 101 is notified to the imaging device 101 (for example, if the file names of eight images are received and the sixth image is desired, the ordinal number "6" is notified. Alternatively, the latest (in the above example, the eighth) image or second latest (seventh) image is requested to be sent. In response to this request, the imaging device 101 transmits the requested image data. The communication device 102 receives this image data at the local communication processing unit 102-*f*.

In another embodiment of this invention, thumbnail images are not displayed at S302, but an image displayed on a display unit of the imaging device 101 is selected by the local communication processing unit 102-*f*. Namely, the communication device 102 operates as a remote controller of the imaging device 101. In this embodiment, the imaging device 101 is an image display apparatus. After the file name of the transmission image data is input (S304), an instruction of transmitting the image displayed at the imaging device 101 is input from the user interface 102-*i* and the public network connection is established (S305). The local communication processing unit 102-*f* requests the imaging device 101 to send the image data of displayed image (S306).

The control unit 102-*a* controls the public network communication processing unit 102-*g* to transmit the image data received from the imaging device 101 via the local communication processing unit 102-*f* and the file name input at S304 to the transmission destination designated at S303 via the public network 103 (S307). In this embodiment, a communication path from the communication device to the transmission destination is established at S305 and the image data is transmitted to the communication path at S307. In another embodiment of the invention, the communication path from the communication device 102 and transmission destination is not established at S305, but at S307 the image data added with the transmission destination data is transmitted from the public network communication processing unit 102-*g* to the public network 103. The transmission destination receives the image data added with the file name entered at S304.

After the image data is transmitted, the local communication connection and public network communication connection are disconnected (S308).

In this embodiment, image data transmitted from the imaging device 101 is transferred to the transmission destination via the pubic network 103. It is therefore unnecessary for the communication device 102 to prepare a large capacity storage device for storing image data.

When the network connecting apparatus 104A or 104B requests the communication device 102 to transfer image data with the designated file name, the communication device 102 converts the designated file name into a file name given by the imaging device 101 by using the database of the file names stored in the imaging device 101 at S304 and the file names of image data transmitted by the communication device 102.

The communication device 102 requests the imaging device to send the image data having the converted file name. The communication device 102 transmits the image data received from the imaging device 101 to the requesting side via the public network 103.

In another embodiment of the invention, the communication device 102 or a wireless phone gives the name of data (not limited to image data) to be transmitted to the public network 103. Data received at the local communication processing unit 102-*f* of the communication device 102 and the name are transmitted from the public network communication processing unit 102-*g* to the public network 103.

The invention has been described for the case that the communication device 102 gives the file name of image data received from the imaging device 101. The invention is not limited only thereto, but the name may be given to data received from a portable terminal equipment capable of transmitting data via a local communication path. The invention is also applicable to the case that the communication device 102 and imaging device 101 are connected by a cable or the communication device 102 and public network 103 are connected by a cable. Various modifications are possible without departing from the scope of claims.

What is claimed is:

1. A communication apparatus comprising:
   local communication means for receiving image data having a first name from an image storing device;
   input means;
   write means for writing a second name input from said input means in the image data received from the image storing device at said local communication means; and
   public network communication means for transmitting the image data written with the second name to a public network,
   wherein upon reception of a request for retransmission of the image data having the second name at said public network communication means after the image data written with the second name is transmitted to the public network, said local communication means requests said image storing device to send the image data having the first name.

2. An apparatus according to claim 1, wherein said local communication means receives the image data using a local wireless communication.

3. An apparatus according to claim 1, wherein said public network communication means transmits the image data using a public wireless communication.

4. A communication program comprising the steps of:

receiving image data having a first name from an image storing device via local communication;

writing a second name input from an operation unit in the image data received from said image storing device via local communication;

transmitting the image data written with the second name to a public network; and requesting, upon reception of a request for retransmission of the image data written with the second name from said public network after the image data written with the second name is transmitted to said public network, the image data with the first name from said image storing device.

5. A program according to claim 4, wherein said receiving step includes receiving the image data using a local wireless communication.

6. A program according to claim 4, wherein said transmitting step includes transmitting the image data using a public wireless communication.

* * * * *